(No Model.)

L. PRAY.
DEVICE FOR WATERING LIVE STOCK.

No. 600,929. Patented Mar. 22, 1898.

Witnesses.
Edwin R. Gardner.
J. A. Shrock

Inventor.
Lewis Pray
By Thomas B. Swan
His Attorney

UNITED STATES PATENT OFFICE.

LEWIS PRAY, OF NOBLE, IOWA.

DEVICE FOR WATERING LIVE STOCK.

SPECIFICATION forming part of Letters Patent No. 600,929, dated March 22, 1898.

Application filed September 20, 1897. Serial No. 652,356. (No model.)

*To all whom it may concern:*

Be it known that I, LEWIS PRAY, a citizen of the United States, residing in Noble township, in the county of Cass and State of Iowa, have invented certain new and useful Improvements in Devices for Watering Live Stock; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in devices for watering live stock; and it consists in the peculiar construction and combination of the parts that will be more fully set forth hereinafter and particularly pointed out in the claims.

The objects of my invention are to provide a device for watering live stock by means of which the drinking vessel will be automatically supplied with water from a reservoir as it is consumed by the stock and a float for controlling the valve of the supply-pipe of the drinking vessel which will operate in freezing weather. I attain these objects by the device illustrated in the accompanying drawings, in which—

Figure 1:
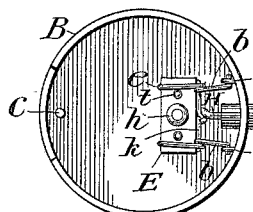
Figure 1:
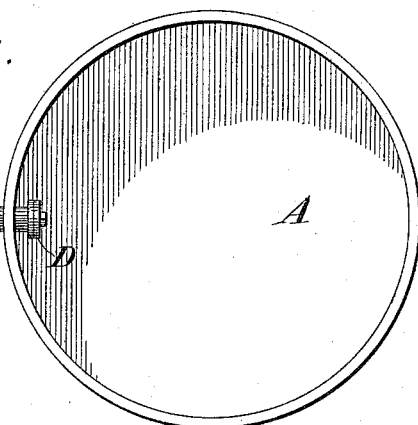
Figure 2:
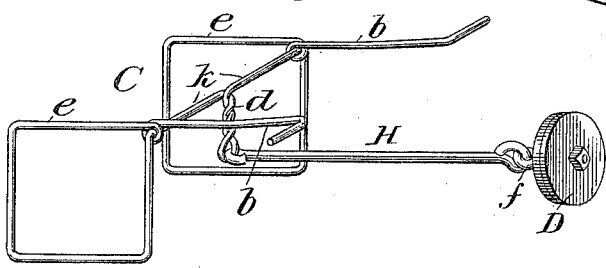
Figure 3:
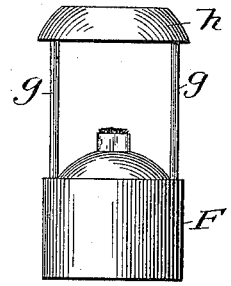
Figure 5:
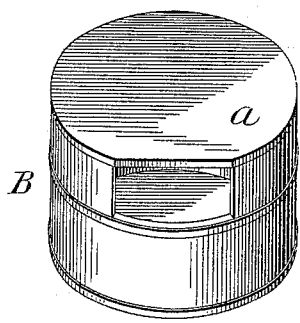
Figure 4:
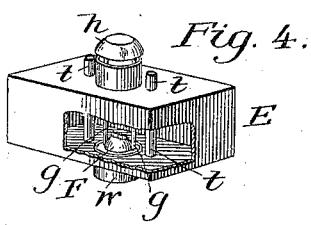

Figure 1 is a top or plan view of my device for watering live stock, having the cover of the drinking vessel removed. Fig. 2 is a detailed enlarged perspective view of the float-carrier, valve, and rod for connecting the valve and carrier. Fig. 3 is an enlarged detailed view in side elevation of the float-lamp. Fig. 4 is an enlarged detailed perspective view of the float having a portion of one of its sides cut away to show its interior, and Fig. 5 is an enlarged detailed perspective view of the drinking vessel.

Similar letters refer to similar parts throughout the several views.

A is a water-reservoir of ordinary construction.

B is the drinking vessel, having the cover $a$ and an aperture in its bottom for the draining and cleaning of the same, which is closed by the plug $c$.

C is the float-carrier, composed of the two loops $e$ for the reception of the float, the rod $k$, connecting the loops, the downwardly-extending lug $d$, and the arms $b$. The carrier is hinged to the drinking vessel by means of the outer bent ends of the arms $b$, extending through the eyes of the screw-eyes $i$, which are screwed into the side of the drinking vessel.

G is a pipe leading from the reservoir A into the drinking vessel B.

D is a valve which bears against the end of the pipe G and is provided with the screw-eye $f$.

H is a rod which is hinged to the lower end of the lug $d$ at one of its ends and to the valve D at its other end and extends through the pipe from the valve D to the lug $d$.

F is an oil-lamp of ordinary construction, provided with the hood $h$, which is supported by the uprights $g$.

E is the float, which is constructed hollow and water-tight, except the apertures in the tubes, which project from its top.

$m$ is a tube projecting from the top of the float, through which the lamp can be inserted into or removed from the float.

$t\ t$ are tubes which project above the top of the float and extend into the float nearly to its bottom, where they open into the float and supply the lamp with air.

$w$ is a cup for the reception of the lamp, which projects from the base of the float. The float is connected to the carrier by being embraced by the loops $e$.

The great difficulty that has heretofore been encountered in the use of devices for watering live stock having a valve for the supply-pipe controlled by a float was that in cold weather the water surrounding the float would freeze and hold the float so that it could not move, which difficulty, by means of my device, is obviated, as the lamp when kept burning within the float heats the float and the water surrounding it to such an extent that it prevents the water from freezing in the coldest weather, thereby permitting the float to operate in freezing weather as readily as in warm weather.

The carrier, float, valve-rod, valve, and supply-pipe are so adjusted that when the drinking vessel is sufficiently full of water the valve will be closed.

The operation of my device is apparent, as it is evident that an upward movement of the float will close the valve and a downward movement open the same, and that when the water is being consumed by the stock the float will fall and open the valve and that when the stock cease to consume the water it will rise in the drinking vessel and cause the float to move upward until the valve is closed.

Having described my invention, what I claim as new, and desire to secure by Letters Patent, is—

1. The combination of the reservoir, the drinking vessel, the supply-pipe leading from the reservoir into the drinking vessel, the valve bearing against the end of supply-pipe, the float-carrier hinged to drinking vessel, the valve-rod connecting the valve and carrier, and the heated float, substantially as described.

2. In a device for watering live stock, a float for controlling the valve of the supply-pipe, provided with a lamp for heating the same.

3. A device for watering live stock, provided with a heated float.

4. In a device for watering live stock, a float provided with means for heating the same.

In testimony whereof I affix my signature in presence of two witnesses.

LEWIS PRAY.

Witnesses:
 GEORGE F. BRUINGTON,
 ED. R. GARDNER.